United States Patent
Schoenefeld et al.

(10) Patent No.: US 9,238,739 B2
(45) Date of Patent: Jan. 19, 2016

(54) EFFECT PIGMENTS

(71) Applicant: Merck Patent GmbH, Darmstadt (DE)

(72) Inventors: Ulrich Schoenefeld, Bickenbach (DE);
Joachim Duschek, Pfungstadt (DE);
Alfred Hennemann, Brombachtal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/418,961

(22) PCT Filed: Jul. 5, 2013

(86) PCT No.: PCT/EP2013/001993
§ 371 (c)(1),
(2) Date: Feb. 2, 2015

(87) PCT Pub. No.: WO2014/019639
PCT Pub. Date: Feb. 6, 2014

(65) Prior Publication Data
US 2015/0166799 A1 Jun. 18, 2015

(30) Foreign Application Priority Data
Aug. 3, 2012 (DE) .......... 10 2012 015 208

(51) Int. Cl.
*C09D 5/29* (2006.01)
*C09D 5/36* (2006.01)
*C09C 1/00* (2006.01)
*C09C 3/12* (2006.01)
*C09C 1/22* (2006.01)
*C09C 1/36* (2006.01)

(52) U.S. Cl.
CPC ............ *C09D 5/36* (2013.01); *C09C 1/0015* (2013.01); *C09C 1/0021* (2013.01); *C09C 1/0024* (2013.01); *C09C 1/0039* (2013.01); *C09C 1/0051* (2013.01); *C09C 1/0066* (2013.01); *C09C 1/0078* (2013.01); *C09C 3/12* (2013.01); *C01P 2006/62* (2013.01); *C09C 2200/102* (2013.01); *C09C 2200/1004* (2013.01); *C09C 2200/408* (2013.01)

(58) Field of Classification Search
CPC ............ C09C 2200/102; C09C 1/0015; C09C 1/0021; C09C 1/3661; C09C 1/36; C09C 1/22; C09D 5/29
USPC ................................. 106/418, 436
See application file for complete search history.

(56) References Cited

U.S. PATENT DOCUMENTS

| 7,160,374 B2 | 1/2007 | Umehara et al. |
| 7,850,775 B2 * | 12/2010 | Hollman et al. ............. 106/418 |
| 8,197,591 B2 | 6/2012 | Kaupp et al. |
| 2004/0069187 A1 | 4/2004 | Umehara et al. |
| 2006/0112859 A1 * | 6/2006 | Pfaff et al. ..................... 106/481 |
| 2007/0295244 A1 * | 12/2007 | Himmelreich et al. .. 106/287.19 |
| 2009/0249979 A1 | 10/2009 | Kaupp et al. |
| 2010/0269733 A1 | 10/2010 | Kremitzl |

FOREIGN PATENT DOCUMENTS

| DE | 102006009129 A1 | 8/2007 |
| DE | 102007061701 A1 | 6/2009 |
| WO | 02/064682 A1 | 8/2002 |

OTHER PUBLICATIONS

International Search Report dated Nov. 6, 2013 issued in corresponding PCT/EP2013/001993 application (pp. 1-2).
R. Ruger et al., "Cosmetic Formulations Containing Special Effect Pigments", Research Disclosure Journal, Research Disclosure Database No. 471001, published Jul. 2003.
R. Ruger et al., "Optically Variable Pigments in Plastics and Plastic Articles", Research Disclosure Journal, Research Disclosure Database No. 472005, published Aug. 2003.

* cited by examiner

*Primary Examiner* — Pegah Parvini
(74) *Attorney, Agent, or Firm* — Millen White Zelano and Branigan, PC; John Sopp; Anthony Zelano

(57) ABSTRACT

The present invention relates to effect pigments based on coated, flake-form substrates, where an organic coating which contains fluoroalkyl groups and hydrophilic groups and is built up from at least one siloxane and/or at least one silane is applied to the substrate as outer layer.

16 Claims, No Drawings

EFFECT PIGMENTS

The present invention relates to effect pigments based on coated, flake-form substrates, where an organic coating which contains fluoroalkyl groups and hydrophilic groups and is built up from at least one siloxane and/or at least one silane is applied to the substrate as outer layer.

Pigments comprising one or more layers comprising an oxide and/or hydroxide of a transition-metal compound, such as, for example, $TiO_2$, $Fe_2O_3$, etc., or mixtures of the oxides, are employed as lustre or effect pigments in many areas of industry, in particular in decorative coating, in plastics, paints, coatings, printing inks and in cosmetic formulations. In particular, pigments which exhibit a metallic lustre are used in many areas, such as, for example, automotive paints. However, plastic parts and paint coats for outdoor applications are often exposed to extreme weathering conditions and long-lasting intense exposure to light for a long time, which results in ageing of the materials.

In particular, outdoor use makes high demands of a pigment. Various factors, such as exposure to light, high atmospheric humidity, high and low temperatures, which burden the pigment occur here. This is evident in discoloration, embrittlement and reduced mechanical and chemical stability. In order to avoid such effects, pigments are often provided with an inorganic post-coating. It is also possible to apply an organic top coat, for example produced from coupling reagents (EP 0632109, EP 1203795, WO 2004/092284, WO 2009/077191, EP 1727864), from perfluoroalkyl phosphates (WO 02/064682) or from oligomeric coupling reagents (EP 0 888 410, EP 0141174, WO 2010/003660). The organic components are preferably used for protection against moisture.

The methods of coating articles with paints or coatings are of major importance. The colour effects and the stability of the applied paints or coatings also play a particular role here. An important coating method is powder coating. Since powder coatings essentially consist only of plastic powders and pigments and contain no solvents, neither solvent emissions nor paint sludges arise during the powder coating operation, and this coating method is thus particularly environmentally friendly.

One problem in this coating method is, however, repeated separation of pigment particles and plastic powder particles as a consequence of different charging and particle parameters.

There therefore continues to be a demand for improved effect pigments, in particular for effect pigments having a metallic appearance and good stability, which are suitable for use in powder coatings.

The present invention relates to effect pigments based on coated, flake-form substrates, where an organic coating which contains fluoroalkyl groups and hydrophilic groups and is built up from at least one siloxane and/or at least one silane is applied to the substrate as outer layer.

Surprisingly, it has now been found that the effect pigments according to the invention are suitable for the production of powder coatings having increased directed scattering at the same time as reduced gloss. The novel effect pigments can preferably be employed both in dry-blend and also in bonding methods and in both methods result in coatings having increased directed scattering at the same time as reduced gloss. In visual impression, this is evident from a novel matt-metallic effect. Silver-white effect pigments in particular exhibit this effect both in dry-blend and also in bonding methods.

Surprisingly, it has been found that the pigments according to the invention generate a strong "leafing" effect (i.e. enrichment at the surface of the paint coat) in the powder coating not only in the dry-blend application, but also with powder coatings produced using the bonding method. This method bonds the effect pigments to the powder coating particles, so that pigment/powder coating separation no longer occurs during the coating operation. This method has the advantage that the overspray can easily be re-used. Due to the bonding, it would be expected that the pigments have less opportunity to float to the surface during baking of the coating and do not exhibit a leafing effect.

A particular advantage of the novel effect pigments is that they can be used to produce coatings having improved abrasion resistance. This is surprising, since pigments which exhibit a strong leafing effect should have low bonding to the coating.

An essential feature of the effect pigments according to the invention is the combination of fluoroalkyl groups and hydrophilic groups in the organic coating. The molar ratio of the fluoroalkyl groups to the hydrophilic groups here is preferably 1:2 to 5:1, preferably 2:1 to 5:1, in particular 3:1 to 5:1.

The hydrophilic groups of the organic coating are preferably amino groups, preferably aminoalkyl groups, both primary and also secondary or tertiary amines. Particular preference is given to primary and/or secondary alkylamino groups, preferably those containing C1-C10, preferably C1-C6 alkyl groups, in particular containing C1-C4-alkyl groups. It is particularly advantageous if both primary and also secondary alkylamino groups are present in the organic coating, in particular those containing C1-C4-alkyl groups.

The fluoroalkyl groups may be both linear and branched fluorinated alkyl groups, preferably C1-C20, in particular C1-C10 alkyl groups, or also fluorinated aryl groups. Particular preference is given to perfluorinated alkyl groups, in particular perfluorinated C1-C10 alkyl groups, especially C2-C6.

A further essential feature of the effect pigments according to the invention is that the organic coating is built up from at least one siloxane and/or at least one silane. The organic coating is preferably built up from at least one siloxane and/or at least two silanes. The organic coating particularly preferably consists of at least one siloxane and/or at least one silane. An organic coating comprising at least one siloxane is especially preferred. The organic coating particularly preferably consists of a siloxane, in particular of one of the siloxanes mentioned as preferred.

The siloxanes and silanes can also be organofunctional siloxanes and/or silanes. "Organofunctional siloxanes and/or silanes" in the sense of the invention are taken to mean siloxanes and/or silanes which contain at least one group which enables bonding to a preferably calcined metal-oxide surface. Examples thereof are hydroxyl, halogen, alkoxy and aryloxy groups. Preference is given to hydroxyl groups and alkoxy groups, which can be converted into corresponding hydroxyl groups by hydrolytic reaction conditions. The latter can bond to the preferably calcined metal-oxide surface and effect anchoring via oxygen bridges. Some or all of the organofunctional groups in the organic coating may have reacted for bonding to the metal-oxide surface.

Preferred silanes according to the invention contain at least one organofunctional group and fluoroalkyl groups and/or hydrophilic groups. Preferred silanes containing fluoroalkyl groups here are silanes of the formula $Rf(CH_2)_nSiX_3$, where Rf is a linear or branched C1-C12 fluoroalkyl group, preferably a perfluoroalkyl group, n is an integer from 1-5 and all X are identical or different and stand for an alkoxy, halogen or alkyl group, where not all X are simultaneously an alkyl group. Suitable silanes are, for example, 1H,1H,2H,2H-perfluorodecyltrimethoxysilane, (3,3,3-trifluoropropyl)methyldimethoxysilane, 1H,1H,2H,2H-perfluorooctyltriethoxysilane and the following silanes:

$CF_3(CF_2)_7(CH_2)_2Si(OCH_3)_3$
$CF_3(CF_2)_{11}(CH_2)_2SiCl_3$
$CF_3(CF_2)_4(CH_2)_2SiCl_3$
$CF_3(CF_2)_2SiCl_3$
$CF_3(CF_2)_{10}(CH_2)_2Si(OCH_3)_3$
$CF_3(CF_2)_5(CH_2)_2Si(OCH_3)_3$
$CF_3(CF_2)_9(CH_2)_2Si(OC_2H_5)_3$
$CF_3(CF_2)_7(CH_2)_2Si(OC_2H_5)_3$
$CF_3(CF_2)_4(CH_2)_2Si(OC_2H_5)_3$
$CF_3(CF_2)_2(CH_2)_2Si(OC_2H_5)_3$
$CF_3(CH_2)_2Si(OCH_3)_3$ and mixtures thereof. Preference is given to 1H,1H,2H,2H-perfluorodecyltrimethoxysilane, (3,3,3-trifluoropropyl)methyldimethoxysilane and 1H,1H,2H,2H-perfluorooctyltriethoxysilane.

Preferred silanes containing hydrophilic groups here are silanes of the formula $R(CH_2)_nSiX_3$ containing amino groups, where R is a linear or branched C1-C12 alkyl group containing at least one amino group, n is an integer from 1-5 and all X are identical or different and stand for an alkoxy, halogen or alkyl group, where not all X are simultaneously an alkyl group. Suitable silanes containing amino groups are, for example: 3-aminopropyltrimethoxysilane, N-(2-aminoethyl)-3-aminopropyltrimethoxysilane, γ-(2-aminoethyl)aminopropylmethyldimethoxysilane, aminopropyltriethoxysilane and mixtures thereof. Preferred silanes containing amino groups are, for example, 3-aminopropyltriethoxysilane and N-(2-aminoethyl)-3-aminopropyltrimethoxysilane.

The use concentrations of the silanes containing fluoroalkyl groups and the silanes containing hydrophilic groups are determined so that the molar ratio of the fluoroalkyl groups to the hydrophilic groups in the organic coating is preferably 1:2 to 5:1, preferably 2:1 to 5:1, in particular 3:1 to 5:1. Alternatively, it is possible to use silanes containing fluoroalkyl groups and hydrophilic groups in corresponding ratio.

It is particularly advantageous for the organic coating to be built up from or consist of organofunctional siloxanes, in particular organofunctional oligo- or polysiloxanes containing the described and preferred fluoroalkyl groups and aminoalkyl groups. Some or all of the organofunctional groups in the organic coating may have reacted for bonding to the metal-oxide surface. Particular preference is given to siloxanes which contain both primary and also secondary amino groups and fluoroalkyl groups, in particular the said preferred amino and fluoro groups.

Preference is given to oligo- or polysiloxanes in which the molar ratio of the fluoroalkyl groups to the aminoalkyl groups is in 1:2 to 5:1, preferably 2:1 to 5:1. Particular preference is given to oligo- or polysiloxanes having a molar ratio of the fluoroalkyl groups to the aminoalkyl groups of 3:1 to 5:1.

Preferred oligo- or polysiloxanes contain C1-C20, preferably C1-C10 fluoroalkyl groups, in particular C2-C6 fluoroalkyl groups.

Preference is likewise given to oligo- or polysiloxanes containing C1-C4-aminoalkyl groups, in particular containing C1-C2-aminoalkyl groups.

Particular preference is given to oligo- or polysiloxanes which contain C2-C6 fluoroalkyl groups, preferably perfluorinated groups, C1-C2-aminoalkyl groups and alkoxy groups, preferably methoxy or ethoxy groups.

Particularly advantageous is the use of oligo- or polysiloxanes containing the preferred fluoro and amino groups and at least one hydroxyl group for bonding to the metal-oxide surface.

The silanes and siloxanes which are essential to the invention for the production of the organic coating which is essential to the invention are commercially available, for example, under the trade name Dynasylan®. If desired, further adaptation of the pigment properties to specific applications can be promoted by addition of further silanes, such as, for example, long-chain alkylsilanes or functionalised silanes.

In a particularly preferred embodiment of the invention, the effect pigments have a surface energy of ≤50 mN/m, preferably of ≤20 mN/m. In particular, effect pigments having a surface energy of ≤10 mN/m are preferred. The surface energy is determined by the "sessile drop" method using the measurement liquids water, 1,2-diiodomethane, benzyl alcohol and 1,2 pentanediol using a Krüss DAS 100 measuring instrument at 22-24° C. 5 μl drops are placed semi-automatically on a pigment layer by means of the Krüss "DAS 3", release 1.7.1, control and evaluation software, and the contact angles between drop and pigment layer surface are measured. The evaluation is carried out by the Owens, Wendt, Rabel and Kaelble method by means of the above-mentioned software.

The amount of the organic coating can be between 0.2 and 5% by weight, based on the effect pigment, preferably 0.5 to 2% by weight.

The organic coating according to the invention may be located on one or more sides of the substrates. The organic coating according to the invention preferably envelops the substrates.

Suitable substrates for the effect pigments according to the invention are, for example, all known flake-form substrates, preferably transparent or semi-transparent flakes. Suitable are, for example, phyllosilicates, in particular synthetic or natural mica, glass flakes, metal flakes, $SiO_x$ flakes (x=2.0, preferably x=2), $Al_2O_3$ flakes, $TiO_2$ flakes, synthetic or natural iron oxide flakes, graphite flakes, liquid crystal polymers (LCPs), holographic pigments, BiOCl flakes or mixtures of the said flakes. The metal flakes can consist, inter alia, of aluminium, titanium, bronze, steel or silver, preferably of aluminium and/or titanium. The metal flakes here may have been passivated by corresponding treatment. Preference is given to synthetic or natural mica flakes, glass flakes, $SiO_2$ flakes and $Al_2O_3$ flakes, in particular synthetic or natural mica flakes and glass flakes. In an embodiment of the invention, synthetic or natural mica flakes are preferred.

In general, the flake-form substrates have a thickness between 0.05 and 5 μm, in particular between 0.1 and 4.5 μm. Glass flakes preferably have a thickness of 1 μm, in particular of 900 nm and very particularly preferably of 500 nm. The size of the substrates is not crucial per se and can be matched to the particular application. The particle size is usually 1-350 μm, preferably 2-200 μm, and in particular between 5-150 μm. In general, both coarse flakes having particle sizes of 10-200 μm, preferably of 40-200 μm, in particular of 10-130 μm, and also fine flakes having particle sizes of 1-60 μm, preferably of 5-60 μm, in particular of 10-40 μm, can be used. Substrate mixtures consist of flakes having different particle sizes can preferably also be employed. Particularly preferred substrate mixtures consist of coarse and fine flakes, in particular S mica (>125 μm) and F mica (<25 μm). The particle sizes are determined using commercially available instruments which are known to the person skilled in the art (for example from Malvern, Horiba) by means of laser diffraction on the powder or on pigment suspensions. The substrates preferably have a form factor (aspect ratio: diameter/thickness ratio) of 5-750, in particular of 10-300 and very particularly preferably of 20-200. In addition, the use of other substrates, such as, for example, spherical particles or needle-shaped substrates, which may be covered with the above-mentioned layers, is also possible.

The flake-form substrate is coated on one or more sides with one or more transparent, semi-transparent and/or opaque layers comprising metal oxides, metal oxide hydrates, metal suboxides, metals, metal fluorides, metal nitrides, metal oxynitrides or mixtures of these materials. The substrate is preferably enveloped by these layers.

The layer to which the organic coating which is essential to the invention is applied is a, preferably calcined, metal-oxide layer.

The metal oxide, metal oxide hydrate, metal suboxide, metal, metal fluoride, metal nitride, metal oxynitride layers or the mixtures thereof can be of low refractive index (refractive index <1.8) or high refractive index (refractive index≥1.8, preferably ≥2.0). Suitable metal oxides and metal oxide hydrates are all metal oxides or metal oxide hydrates known to the person skilled in the art, such as, for example, aluminium oxide, aluminium oxide hydrate, silicon oxide, silicon oxide hydrate, iron oxide, tin oxide, cerium oxide, zinc oxide, zirconium oxide, chromium oxide, titanium oxide, in particular titanium dioxide, in the rutile or anatase modification, titanium oxide hydrate and mixtures thereof, such as, for example, ilmenite or pseudobrookite. Metal suboxides which can be employed are, for example, the titanium suboxides. Suitable metals are, for example, chromium, aluminium, nickel, silver, gold, titanium, copper or alloys, a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly preferably metal oxide and/or metal oxide hydrate layers are preferably applied to the substrate. Particular preference is given to oxides and/or oxide hydrates of aluminium, silicon, iron, tin and titanium, in particular titanium dioxide, in the rutile or anatase modification, preferably in the rutile modification, and mixtures of these compounds. For conversion of titanium dioxide into the rutile modification, a tin dioxide layer is usually applied beneath a titanium dioxide layer. Thus, the effect pigments according to the invention may, for conversion of the titanium dioxide present in the outer coating which is essential to the invention into the rutile modification, also comprise a tin dioxide layer between substrate and outer coating. Furthermore, multilayered structures comprising high- and low-refractive-index metal oxide, metal oxide hydrate, metal or metal fluoride layers may also be present, where high- and low-refractive-index layers preferably alternate. Particular preference is given to layer packages comprising a high-refractive-index layer (refractive index ≥2.0) and a low-refractive-index layer (refractive index <1.8), where one or more of these layer packages may have been applied to the substrate. The sequence of the high- and low-refractive-index layers can be matched to the substrate here in order to include the substrate in the multilayered structure. In a further embodiment, the metal oxide, metal oxide hydrate, metal suboxide, metal, metal fluoride, metal nitride, metal oxynitride layers may have been mixed or doped with colorants or other elements. Suitable colorants or other elements are, for example, organic or inorganic coloured pigments, such as coloured metal oxides, for example magnetite, chromium oxide, or coloured pigments, such as, for example, Berlin Blue, ultramarine, bismuth vanadate, Thenard's Blue, or alternatively organic coloured pigments, such as, for example, indigo, azo pigments, phthalocyanines or also Carmine Red, or elements, such as, for example, yttrium or antimony. Effect pigments comprising these layers exhibit high colour variety in relation to their mass tone and can in many cases exhibit an angle-dependent change in the colour (colour flop) due to interference.

The outer layer on the support is, in a preferred embodiment, a high-refractive-index metal oxide. This outer layer may additionally be part of the layer package on the above-mentioned layer packages or in the case of high-refractive-index supports and consist, for example, of $TiO_2$, titanium suboxides, $Fe_2O_3$, $SnO_2$, $ZnO$, $ZrO_2$, $Ce_2O_3$, $CoO$, $Co_3O_4$, $V_2O_5$, $Cr_2O_3$ and/or mixtures thereof, such as, for example, ilmenite or pseudobrookite. $TiO_2$ is particularly preferred, in particular in the rutile modification.

Preferred effect pigments have the following structure (A), (B) or (C) of the underlying coated substrates, where $TiO_2$/$Fe_2O_3$ a layer comprising $TiO_2$ and $Fe_2O_3$ as a mixture or as mixed oxide, for example pseudobrookite. Oxides in brackets are optional. For conversion of titanium dioxide into the rutile modification, a tin dioxide layer is preferably applied beneath a titanium dioxide layer.

(A):
substrate flake+$(SiO_2)$+$TiO_2$ (rutile)
substrate flake+$(SiO_2)$+$SiO_2$+$TiO_2$ (rutile)
substrate flake+$(SiO_2)$+$TiO_2$ (rutile)+$SiO_2$+$TiO_2$ (rutile)
substrate flake+$(SiO_2)$+$TiO_2$ (anatase)+$SiO_2$+$TiO_2$ (anatase)
substrate flake+$(SiO_2)$+$TiO_2$/$Fe_2O_3$+$SiO_2$+$TiO_2$+$TiO_2$/$Fe_2O_3$
substrate flake+$(SiO_2)$+$TiO_2$/$Fe_2O_3$+$SiO_2$+$TiO_2$/$Fe_2O_3$.

Particular preference is given to effect pigments having the following structure:
(B):
mica+$(SnO_2)$+$TiO_2$
mica+$TiO_2$/$Fe_2O_3$
mica+$(SnO_2)$+$TiO_2$+$SiO_2$+$TiO_2$
mica+$TiO_2$/$Fe_2O_3$
mica+$TiO_2$/$Fe_2O_3$+$SiO_2$+$TiO_2$
mica+$TiO_2$/$Fe_2O_3$+$SiO_2$+$TiO_2$/$Fe_2O_3$
mica+$TiO_2$/$Fe_2O_3$+$SiO_2$+$TiO_2$+$TiO_2$/$Fe_2O_3$
mica+$(SnO_2)$+$TiO_2$+$SiO_2$+$TiO_2$/$Fe_2O_3$
mica+$TiFe_2O_5$
$Al_2O_3$ flake+$TiO_2$
$SiO_2$ flake+$TiO_2$
glass flake+$TiO_2$
glass flake+$SiO_2$+$TiO_2$
glass flake+$SiO_2$+$TiO_2$+$SiO_2$
glass flake+$TiO_2$+$SiO_2$+$TiO_2$
glass flake+$(SiO_2)$+$TiO_2$/$Fe_2O_3$
glass flake+$(SiO_2)$+$TiO_2$/$Fe_2O_3$+$SiO_2$+$TiO_2$
glass flake+$(SiO_2)$+$TiO_2$/$Fe_2O_3$+$SiO_2$+$TiO_2$/$Fe_2O_3$
glass flake+$(SiO_2)$+$TiO_2$/$Fe_2O_3$+$SiO_2$+$TiO_2$+$TiO_2$/$Fe_2O_3$
glass flake+$(SiO_2)$+$TiO_2$+$SiO_2$+$TiO_2$/$Fe_2O_3$
glass flake+$(SiO_2)$+$TiFe_2O_5$ Especial preference is given to effect pigments having the following structure:
(C):
mica+$TiO_2$
mica+$TiO_2$+$SiO_2$+$TiO_2$
mica+$TiO_2$/$Fe_2O_3$+$SiO_2$+$TiO_2$
mica+$(SnO_2)$+$TiO_2$ (rutile)
mica+$(SnO_2)$+$TiO_2$ (rutile)+$SiO_2$+$TiO_2$ (rutile)
mica+$TiO_2$ (anatase)+$SiO_2$+$TiO_2$ (anatase)

The layers of metal oxides, hydroxide and/or oxide hydrates are preferably applied by wet-chemical methods, where the wet-chemical coating methods developed for the preparation of effect pigments, which result in enveloping of the substrate, can be used. After the wet-chemical application of the outer coating according to the invention, the substances may be in the form of oxides, hydroxides and/or oxide hydrates. The coated products are subsequently separated off, washed, dried and preferably calcined. The oxides, hydroxides and/or oxide hydrates formed during the wet-chemical application are thereby converted into the corresponding oxides and/or mixed oxides. The drying can be carried out at temperatures of 50-150° C. for usually 0 minutes, if necessary for 6-18 hours. The calcination can be carried out at temperatures of 250-1000° C., preferably at 500-900° C., for usually 0.5-3 hours.

The thickness of the individual layers on the substrate is, as is familiar to the person skilled in the art, essential for the optical properties of the pigment. The thickness of the metal oxide, metal oxide hydrate, metal suboxide, metal, metal fluoride, metal nitride, metal oxynitride layers or a mixture thereof is usually 10 to 1000 nm, preferably 15 to 800 nm, in particular 20 to 600 nm. Particularly suitable are layer thicknesses of 20 to 200 nm. The thickness of the metal layers is preferably 4 to 50 nm.

Processes of this type for the preparation of effect pigments are familiar to the person skilled in the art. Examples and embodiments of the above-mentioned materials and pigment structures can also be found, for example, in Research Disclosures RD 471001 and RD 472005. Pigments of this type are also commercially available, for example under the trade names Iriodin®, Pyrisma®, Xirallic®, Colorstream® and Phoenix®.

The organic coating which is essential to the invention is preferably applied to a metal-oxide-containing, preferably calcined coating of the flake-form substrates.

Preferred embodiments of the invention include the combination of the preferred, in particular the particularly preferred, organic coatings with the preferred, in particular the particularly preferred, substrates.

Particularly advantageous is invention variant A, in which effect pigments which comprise, as substrates, natural or synthetic mica or glass flakes coated with metal oxides, preferably $TiO_2$, are provided with an organic coating comprising at least one siloxane. The organic coating here is preferably applied by treatment of the coated substrates with at least one organofunctional oligo- or polysiloxane containing fluoroalkyl groups and aminoalkyl groups, in particular the corresponding preferred groups.

Especially advantageous is invention variant B, in which effect pigments according to the invention comprise, as coated substrates, the substrates mentioned above under (A), (B) and (C) and an organic coating which has been applied by treatment of the coated substrates with at least one organofunctional oligo- or polysiloxane containing fluoroalkyl groups and aminoalkyl groups. Particular preference is given here to organofunctional oligo- or polysiloxanes containing the fluoroalkyl, aminoalkyl and organofunctional groups described as preferred.

Preference is given to effect pigments of invention variants A and B which in addition have a surface energy of 50 mN/m, preferably 20 mN/m. Particular preference is given to effect pigments having a surface energy of 10 mN/m, especially those in which the organic coating is between 0.2 and 5% by weight, based on the effect pigment, preferably 0.5 to 2% by weight.

Particularly preferred effect pigments according to the invention are silver-white effect pigments having a matt-metallic effect, in particular effect pigments of preferred invention variants A and B, especially the preferred variants thereof. The organic coating according to the invention, in particular the preferred variants thereof, has proven particularly advantageous for effect pigments of variant C.

The invention furthermore relates to a process for the preparation of the effect pigments according to the invention in which a coated, flake-form substrate is suspended in water or in a water-based liquid and, for application of an organic coating, is treated with siloxanes and/or silanes, where the siloxanes and silanes and contain organofunctional groups and fluoroalkyl groups and/or aminoalkyl groups. Use is preferably made of the above-mentioned siloxanes and/or silanes.

Preferred silanes according to the invention contain at least one organofunctional group and fluoroalkyl groups and/or hydrophilic groups. Preferred silanes containing fluoroalkyl groups here are silanes of the formula $Rf(CH_2)_nSiX_3$, where Rf is a linear or branched C1-C12 fluoroalkyl group, preferably a perfluoroalkyl group, n is an integer from 1-5, and all X are identical or different and stand for an alkoxy, halogen or alkyl group, where not all X are simultaneously an alkyl group. Suitable silanes are, for example, 1H,1H,2H,2H-perfluorodecyltrimethoxysilane, (3,3,3-trifluoropropyl)methyldimethoxysilane, 1H,1H,2H,2H-perfluorooctyltriethoxysilane and the following silanes:

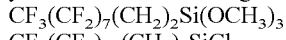
$CF_3(CF_2)_7(CH_2)_2Si(OCH_3)_3$
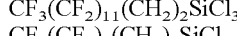
$CF_3(CF_2)_{11}(CH_2)_2SiCl_3$
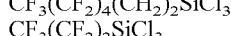
$CF_3(CF_2)_4(CH_2)_2SiCl_3$
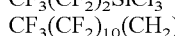
$CF_3(CF_2)_2SiCl_3$
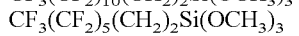
$CF_3(CF_2)_{10}(CH_2)_2Si(OCH_3)_3$
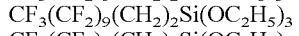
$CF_3(CF_2)_5(CH_2)_2Si(OCH_3)_3$
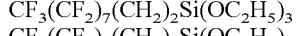
$CF_3(CF_2)_9(CH_2)_2Si(OC_2H_5)_3$
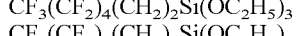
$CF_3(CF_2)_7(CH_2)_2Si(OC_2H_5)_3$
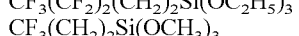
$CF_3(CF_2)_4(CH_2)_2Si(OC_2H_5)_3$
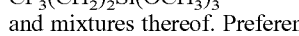
$CF_3(CF_2)_2(CH_2)_2Si(OC_2H_5)_3$
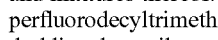
$CF_3(CH_2)_2Si(OCH_3)_3$ and mixtures thereof. Preference is given to 1H,1H,2H,2H-perfluorodecyltrimethoxysilane, (3,3,3-trifluoropropyl)methyldimethoxysilane and 1H,1H,2H,2H-perfluorooctyltriethoxysilane.

Preferred silanes containing hydrophilic groups here are silanes of the formula $R(CH_2)_nSiX_3$ containing amino groups, where R is a linear or branched C1-C12 alkyl group containing at least one amino group, n is an integer from 1-5, and all X are identical or different and stand for an alkoxy, halogen or alkyl group, where not all X are simultaneously an alkyl group. Suitable silanes containing amino groups are, for example:
3-aminopropyltrimethoxysilane, N-(2-aminoethyl)-3-aminopropyltrimethoxysilane, γ-(2-aminoethyl)aminopropylmethyldimethoxysilane, aminopropyltriethoxysilane and mixtures thereof. Preferred silanes containing amino groups are, for example, 3-aminopropyltriethoxysilane and N-(2-aminoethyl)-3-aminopropyltrimethoxysilane.

The use concentrations of the silanes containing fluoroalkyl groups and the silanes containing hydrophilic groups are determined so that the molar ratio of the fluoroalkyl groups to the hydrophilic groups in the organic coating is preferably 1:2 to 5:1, preferably 2:1 to 5:1, in particular 3:1 to 5:1. Alternatively, it is also possible to use silanes which contain fluoroalkyl groups and hydrophilic groups in the corresponding ratio.

Preferred siloxanes contain organofunctional groups and fluoroalkyl groups and amino groups. Particular preference is given to siloxanes which contain both primary and also secondary amino groups and fluoroalkyl groups, in particular the said preferred amino and fluoro groups. Preference is given to oligosiloxanes and polysiloxanes.

Preference is given to oligo- or polysiloxanes in which the molar ratio of the fluoroalkyl groups to the aminoalkyl groups is in 1:2 to 5:1, preferably 2:1 to 5:1. Particular preference is given to oligo- or polysiloxanes having a molar ratio of the fluoroalkyl groups to the aminoalkyl groups of 3:1 to 5:1.

Preferred oligo- or polysiloxanes contain C1-C20, preferably C1-C10 fluoroalkyl groups, in particular C2-C6 fluoroalkyl groups.

Preference is likewise given to oligo- or polysiloxanes containing C1-C4-aminoalkyl groups, in particular containing C1-C2-aminoalkyl groups.

Particular preference is given to oligo- or polysiloxanes which contain C2-C6 fluoroalkyl groups, preferably perfluorinated groups, C1-C2-aminoalkyl groups and alkoxy groups, preferably methoxy or ethoxy groups.

Particularly advantageous is the use of oligo- or polysiloxanes containing the preferred fluoro and amino groups and at least one hydroxyl group for bonding to the metal-oxide surface.

The silanes and siloxanes which are essential to the invention for the production of the organic coating which is essential to the invention are commercially available, for example, under the trade name Dynasylan®. If desired, further adaptation of the pigment properties to specific applications can be promoted by addition of further silanes, such as, for example, long-chain alkylsilanes or functionalised silanes.

The siloxanes and/or silanes are applied in solution at temperatures above 60° C., preferably above 70° C. Suitable solvents are organic solvents, water or mixtures thereof, water is preferably used. The reaction time necessary for the application of the organic coating is at least 5 minutes, it preferably takes place over a period of 10 to 90 minutes, but can also be extended as desired. The pigment obtained is worked up and isolated by methods customary to the person skilled in the art, for example by filtration, drying and sieving.

If desired, one of the inorganic post-coatings known to the person skilled in the art can be applied to the coated inorganic substrates before application of the organic coating according to the invention, such as, for example, post-coatings comprising oxides and/or oxide hydrates of zirconium, cerium, aluminium, silicon, and/or titanium or mixed oxides thereof.

Owing to their colouristic and functional properties, the effect pigments according to the invention can be employed in a multiplicity of applications. The possible applications and the colouristic effect of these effect pigments are significantly broadened by the surface modification according to the invention. Effect pigments having the novel surface modification can be used in paints, coatings, in particular automotive paints, industrial coatings, powder coatings, printing inks, security applications, cosmetic formulations, plastics, ceramic materials, glasses, paper, in toners for electrophotographic printing processes, in seed, in greenhouse sheeting and tarpaulins, as absorbers in the laser marking of paper and plastics, as absorbers in the laser welding of plastics and in cosmetic formulations.

In particular, the use of the effect pigments according to the invention in coatings, in particular automotive paints, and the use in plastics is preferred. Furthermore, the pigments according to the invention are also suitable for the preparation of pigment pastes with water, organic and/or aqueous solvents, pigment preparations and for the preparation of dry preparations, such as, for example, granules, chips, pellets, briquettes, etc. The pigments can be incorporated into the respective application media by all methods known to the person skilled in the art.

Powder coatings, automotive paints and coatings for outdoor applications are particularly preferred, since an increase in the weathering stability is particularly advantageous in these applications.

The particles according to the invention are particularly preferably used in powder coatings. Particular preference is given to polyester powder coatings, epoxide powder coatings, polyester/epoxide powder coatings, acrylate powder coatings and mixtures of these powder coatings. Powder coatings having high luminance (brightness), highly directed scattering and/or with matting can particularly preferably be achieved with the effect pigments according to the invention. Since powder coatings essentially consist only of plastic powders and pigments and contain no solvents, neither solvent emissions nor paint sludges arise during the powder coating operation, and this coating method is thus particularly environmentally friendly.

In an embodiment of the invention, the effect pigments according to the invention are applied in mixtures with powder coatings, for example in so-called dry blends. In this case, the particles according to the invention can be employed in concentrations of ≤10% by weight, based on the total weight of the dry blend. The particles according to the invention are preferably employed in concentrations of 2 to 8% by weight, based on the total weight of the dry blend. However, the use of up to 10% by weight is also possible.

The production of the powder coatings according to the invention is simple and easy to carry out. The particles according to the invention are mixed with the powder coating, for example using a paddle or tumble mixer. The so-called bonding method, in which the powder coating base material is warmed, under nitrogen as protective gas, to a temperature just below the softening point, the pigment is then added, and, after the mixing operation, the powder coating produced in this way is cooled, is also suitable. This method bonds the effect pigments to the powder coating particles, so that pigment/powder coating separation no longer occurs during the coating operation. This method has the advantage that the overspray can easily be re-used. The powder coating obtained is circulation-stable, i.e. no separation occurs during the coating operation. If the powder coating according to the invention is applied to the material to be coated, this is carried out in such a way that the material surface is completely covered by a homogeneous powder coating layer.

The powder coating according to the invention can be applied to any desired materials, for example iron, steel, aluminium, copper, bronze, brass and metal foils, but also conductive modified surfaces of glass, ceramic and concrete and the like, and also to non-conductive surfaces, such as wood, glass, ceramic, plastics, inorganic building materials or other materials for decorative and/or protective purposes.

The invention therefore furthermore relates to the use of the effect pigments according to the invention in powder coatings or powder coatings comprising these effect pigments. The preferred effect pigments can advantageously be used, in particular the effect pigments of preferred invention variants A and B, especially the preferred variants thereof. A particular advantage of the effect pigments according to the invention is that they can be used to achieve powder coatings having high luminance (brightness), highly directed scattering and/or with matting. Such coatings can be achieved, in particular, with the effect pigments of preferred invention variants A and B, especially with the preferred variants thereof.

The particles according to the invention can also advantageously be used in a mixture with fillers and/or organic dyes and/or pigments, such as, for example, transparent and opaque white, coloured and black pigments, and with flake-form iron oxides, organic pigments, holographic pigments, LCPs (liquid crystal polymers) and conventional transparent, coloured and black lustre pigments based on metal oxide-coated flakes based on mica, glass, $Fe_2O_3$, $SiO_2$, etc. The particles according to the invention can be mixed with commercially available pigments and fillers in any ratio.

Fillers which may be mentioned are, for example, natural and synthetic mica, nylon powder, pure or filled melamine resins, talc, glasses, kaolin, oxides or hydroxides of magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. In accordance with requirements, it can be, for example, flakeform, spherical or needle-shaped.

The complete disclosure content of all cited applications and publications is incorporated into this application by way of reference. For the present invention, both the plural form of a term and also the singular form of a term also means the respective other form, unless expressly indicated otherwise. All features of the present invention can be combined with one another in any way, unless certain features are mutually exclusive. This applies, in particular, to preferred and particularly preferred features. Further features, advantages and variants of the invention also arise from the claims and examples. The following examples explain the present invention in greater detail without restricting the scope of protection.

EXAMPLES

Example 1

5 g of 1H,1H,2H,2H-perfluorooctyltriethoxysilane (Dynasylan® F 8261, Evonik) are mixed with 200 g of isopropanol. After addition of 20 g of water and 10 g of glacial acetic acid, the mixture is stirred until (>3 hours) a clear solution forms. This is mixed with 1000 g of Iriodin® 103 (Merck) in a heatable mixer. After 40 minutes, a mixture of 2 g of Dynasylan® AMEO (aminopropyltriethoxysilane, Evonik) in 100 ml of isopropanol and 5 g of water is added over the course of 10 minutes, and the batch is mixed for a further 30 minutes, the batch is dried by heating at 120° C. and sieved with a 63 μm mesh width.

Example 2

100 g of Pyrisma® M30-58 Color Space Mass-Tone Orange (Merck) are suspended in 1 l of water and heated to 60° C. with stirring. A pH of 4 is set using acetic acid, and 3.5 g of Dynasylan® F8815 (Evonik) are added dropwise over the course of 10 minutes. A pH of 8 is set using ammonia solution over the course of 20 minutes, and the mixture is stirred for a further 30 minutes. After filtration, the product is freed from water at 120° and sieved with a 40 μm mesh width.

Example 3

0.5 g of 1H,1H,2H,2H-perfluorooctyltriethoxysilane (Dynasylan® F 8261) are mixed with 50 g of isopropanol. After addition of 2 g of water and 1 g of glacial acetic acid, the mixture is stirred until (>3 hours) a clear solution forms. This is metered at 40° C. into a suspension of 100 g of Iriodin® 307 Star Gold (Merck) in 1 l of water, adjusted to pH4 using acetic acid. 0.05 g of Dynasylan® DAMO (N-(2-aminoethyl)-3-aminopropyltrimethoxysilane, Evonik) are subsequently slowly added dropwise, and the batch is stirred at 60° for a further 30 minutes. After filtration and drying at 120° C., the product is sieved with a 40 μm mesh width.

Example 4

1000 of Iriodin® 4504 Lava Red (Merck) are pre-wetted with 100 g of water in a heatable mixer. 35 g of Dynasylan® F8815 (Evonik) are added, followed by 100 g of a 2.5% ammonia solution. The batch is mixed at 60° C. for 30 minutes and freed from water at 120° C. The product is subsequently sieved with a 63 μm mesh width.

Comparative Example 5

5 g of 1H,1H,2H,2H-perfluorooctyltriethoxysilane (for example Dynasylan® F 8261) are mixed with 200 g of isopropanol. After addition of 20 g of water and 10 g of glacial acetic acid, the mixture is stirred until (>3 hours) a clear solution forms. This is mixed with 1000 g of Iriodin® 103 (Merck) in a heatable mixer. The batch is mixed for a further 30 minutes, dried by heating at 120° C. and sieved with a 63 μm mesh width.

Example 6

The surface energy of the pigments prepared in accordance with Examples 1 to 5 and the untreated pigments is determined by the "sessile drop" method using the measurement liquids water, 1,2-diiodomethane, benzyl alcohol and 1,2 pentanediol using the Krüss DAS 100 measuring instrument at 22-24° C. 5 μl drops are placed semi-automatically on a pigment layer by means of the Krüss "DAS 3", release 1.7.1, control and evaluation software, and the contact angle between drop and pigment layer surface is measured. The evaluation is carried out by the Owens, Wendt, Rabel and Kaelble method by means of the above-mentioned software.

The data determined are summarised in Table 1.

TABLE 1

| Example | Surface energy [mN/m] | |
| | Base pigment | Modified |
| --- | --- | --- |
| 1 | 55.0 | 6.8 |
| 2 | 58.3 | 8.9 |
| 3 | 57.8 | 11.5 |
| 4 | 58.4 | 7.0 |
| 5 | 55.0 | 4.8 |

Example 7 to 15

The pigments prepared in accordance with Examples 1 to 5 and, as comparison, the untreated pigments are coated electrostatically onto aluminium sheeting in a concentration of 5% in a commercially available black powder coating (Tiger Drylac series 59 high-gloss) and baked at 200° C. for 10 minutes. The application is carried out by the dry-blend and bonding method. The thickness of the coating is 70 to 90 μm. The abrasion resistance of the coating is determined qualitatively by rubbing with a cotton cloth (100 strokes). The luminances and directed scattering of the powder coating are determined by means of a colorimeter (BykMac from Byk-Gardner), the gloss is measured using a micro-TRI-gloss glossmeter (BykGardner).

The directed scattering is determined from the luminances of the measurement angles θ 15°, 25°, 45°, 75° and 110°:

$$L = \frac{\beta}{\theta^2 + \alpha} + \gamma$$

where the parameters α, β and γ are determined by the least-squares method via the measurement angles θ=15°, 25°, 45°, 75° and 110°. The quotient β/α here denotes the directed scattering in the perpendicular (θ=0°). The data determined are summarised in Table 2.

TABLE 2

| Pigment | Application | L*15° | β/α | Gloss 20° |
|---|---|---|---|---|
| Example 1 | dry blend | 94 | 170 | 22 |
| Iriodin ® 103 | dry blend | 72 | 119 | 42 |
| Example 1 | bonding | 65 | 124 | 43 |
| Iriodin ® 103 | bonding | 56 | 113 | 55 |
| Example 2 | dry blend | 69 | 129 | 18 |
| Pyrisma ® M30-58 Orange | dry blend | 48 | 108 | 59 |
| Example 2 | bonding | 40 | 104 | 56 |
| Pyrisma ® M30-58 Orange | bonding | 42 | 112 | 65 |
| Example 3 | dry blend | 104 | 197 | 22 |
| Iriodin ® 307 Star Gold | dry blend | 74 | 126 | 54 |
| Example 3 | bonding | 48 | 109 | 66 |
| Iriodin ® 307 Star Gold | bonding | 46 | 112 | 76 |
| Example 4 | dry blend | 73 | 167 | 11 |
| Iriodin ® 4504 | dry blend | 43 | 112 | 60 |
| Example 4 | bonding | 38 | 133 | 56 |
| Iriodin ® 4504 | bonding | 33 | 137 | 71 |

All panels shown in Table 2, comprising the pigments prepared in accordance with Example 1 to 4 or the basic pigments, have good to very good abrasion resistance. By contrast, significant proportions of pigment from Comparative Example 5 can be rubbed off the panels coated in dry-blend, but also in bonding application, with a few strokes.

It is clear from Table 2 that all pigments prepared in accordance with the invention in dry blend application have significantly increased luminance) (L*15° and directed scattering (β/α) at the same time as greatly reduced gloss (gloss 20°). In visual impression, this is evident from a novel matt-metallic effect. In the case of Example 1 (silver-white effect pigment), the effect is also retained on use of the bonding method, whereas in the case of effect pigments having a pronounced mass tone (Examples 2 to 4), only the matting is essentially retained. These effects can also be observed in the case of smaller and larger layer thicknesses of the powder coatings.

The invention claimed is:

1. Effect pigments comprising: a flake-form substrate; a coating on one or more sides of the substrate of one or more transparent, semi-transparent and/or opaque layers comprising metal oxides, metal oxide hydrates, metal suboxides, metals, metal fluorides, metal nitrides, metal oxynitrides or mixtures of these materials; and an outer organic coating, wherein the organic coating contains fluoroalkyl groups and hydrophilic aminoalkyl groups and the organic coating contains at least one siloxane and/or at least one silane.

2. Effect pigments comprising a flake-form substrate; a coating on one or more sides of the substrate of one or more transparent, semi-transparent and/or opaque layers comprising metal oxides, metal oxide hydrates, metal suboxides, metals, metal fluorides, metal nitrides, metal oxynitrides or mixtures of these materials; and an outer organic coating, wherein the organic coating consists of at least one oligosiloxane and/or polysiloxane containing fluoroalkyl groups and hydrophilic amino groups.

3. Effect pigments comprising a flake-form substrate; a coating on one or more sides of the substrate of one or more transparent, semi-transparent and/or opaque layers comprising metal oxides, metal oxide hydrates, metal suboxides, metals, metal fluorides, metal nitrides, metal oxynitrides or mixtures of these materials; and an outer organic coating, wherein the organic coating contains fluoroalkyl groups and hydrophilic amino groups and the organic coating contains at least one siloxane and/or at least one silane, wherein the molar ratio of the fluoroalkyl groups to the hydrophilic amino groups in the organic coating is 1:2 to 5:1.

4. Effect pigments according to claim 1, wherein the pigments have a surface energy of ≤20 mN/m.

5. Effect pigments according to claim 1, wherein the flake-form substrates are selected from synthetic or natural mica flakes, glass flakes, SiO$_2$ flakes and Al$_2$O$_3$ flakes and the coating thereon is with oxides and/or oxide hydrates of aluminium, silicon, iron, tin or titanium, or mixtures thereof, and mixtures of these coated substrates.

6. Effect pigments according to claim 1, wherein the flake-form substrates have a metal-oxide coating to which the organic coating has been applied.

7. Process for the preparation of the effect pigments according to claim 1, comprising: suspending a coated, flake-form substrate in water or in a water-based liquid and, for application of an organic coating, treating with siloxanes and/or silanes, where the siloxanes and/or silanes contain fluoroalkyl groups and hydrophilic aminoalkyl groups.

8. Process according to claim 7, characterised in that the siloxanes are oligosiloxanes and/or polysiloxanes containing fluoroalkyl groups and hydrophilic aminoalkyl groups.

9. A powder coating composition comprising an effect pigment according to claim 1.

10. Effect pigments according to claim 1, wherein the molar ratio of the fluoroalkyl groups to the hydrophilic amino groups in the organic coating is 2:1 to 5:1.

11. Effect pigments according to claim 1, wherein the molar ratio of the fluoroalkyl groups to the aminoalkyl groups in the organic coating is 1:2 to 5:1.

12. Effect pigments according to claim 1, wherein the pigments have a surface energy of ≤10 mN/m.

13. Effect pigments according to claim 1, wherein the flake-form substrates are selected from titanium dioxide, in the rutile or anatase modification, which have been coated with oxides and/or oxide hydrates of aluminium, silicon, iron, tin or titanium, or mixtures thereof.

14. A paint, coating, printing ink, security application, cosmetic formulation, plastic, ceramic material, glass, paper, toner for electrophotographic printing processes, seed, greenhouse sheeting or tarpaulin, absorber for the laser marking of paper and plastics, absorbers for the laser welding of plastics which comprises effect pigments according to claim 1.

15. An automotive paint which comprises effect pigments according to claim 1.

16. An industrial coating which comprises effect pigments according to claim 1.

* * * * *